(12) United States Patent
Brignac et al.

(10) Patent No.: US 7,612,012 B2
(45) Date of Patent: Nov. 3, 2009

(54) SELECTIVELY SUPPRESSED HYDROGENATION CATALYST

(75) Inventors: Garland B. Brignac, Clinton, LA (US); Michele S. Touvelle, Centreville, VA (US); William C. Baird, Jr., Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 769 days.

(21) Appl. No.: 11/234,668

(22) Filed: Sep. 22, 2005

(65) Prior Publication Data

US 2006/0019826 A1     Jan. 26, 2006

Related U.S. Application Data

(62) Division of application No. 10/375,812, filed on Feb. 27, 2003, now Pat. No. 7,074,735.

(60) Provisional application No. 60/364,275, filed on Mar. 13, 2002.

(51) Int. Cl.
*B01J 23/44* (2006.01)
(52) U.S. Cl. ..................... 502/314; 502/333
(58) Field of Classification Search ............ 502/439, 502/515, 314, 333, 334, 335, 336
See application file for complete search history.

(56) References Cited

U.S. PATENT DOCUMENTS 5,217,935 A * 6/1993 Van Driesen ............... 502/23
5,306,681 A * 4/1994 Schorfheide et al. ........ 502/22

* cited by examiner

*Primary Examiner*—Edward M Johnson

(57) ABSTRACT

The hydrogenation activity of a heteroatom removal catalyst, having activity for both heteroatom removal and hydrogenation, is selectively suppressed by a treatment which comprises contacting the catalyst with (i) hydrogen, (ii) a selectively deactivating agent that suppresses the catalyst's hydrogenation activity, and (iii) a protective agent, such as CO, that preserves and protects the heteroatom removal activity during the treatment. This may be achieved in a reactor while it is on-line and removing heteroatoms from a hydrocarbon feed.

7 Claims, 3 Drawing Sheets

SELECTIVELY SUPPRESSED HYDROGENATION CATALYST

CROSS REFERENCE TO RELATED APPLICATIONS

This application is a divisional of application Ser. No. 10/375,812, now U.S. Pat. No. 7,074,735, filed on Feb. 27, 2003, which claims benefit of provisional application 60/364,275, filed on Mar. 13, 2002.

FIELD OF THE INVENTION

The invention relates to selectively suppressing the hydrogenation activity of a catalyst. More particularly the invention relates to a method for selectively decreasing the hydrogenation activity of a catalyst having activity for both heteroatom removal and hydrogenation.

BACKGROUND OF THE INVENTION

Some catalysts have two or more types of catalytic activity. This bifunctionality is believed to result from the presence, on the surface of the catalyst, of different types of catalytic activity sites. There are situations where it is desirable to suppress one type of catalytic activity while retaining the other. For example, in heteroatom removal catalysts, i.e., those that remove sulfur and other heteroatoms from a hydrocarbon feed, it may be desirable to suppress the catalyst's hydrogenation activity while retaining its heteroatom removal activity. Suppressing a catalyst's hydrogenation activity would be desirable when, for example, the catalyst is to be used for desulfurizing hydrocarbon streams containing desirable olefins, diolefins and aromatic unsaturates, such as naphthas for motor gasoline (mogas), diesel fractions, coker gas oil, and the like. Suppressing a catalyst's hydrogenation activity would also decrease the consumption of valuable hydrogen during the heteroatom removal process.

As an example specific to mogas, the primary mogas blend stocks are derived from FCC naphthas which, in addition to unwanted sulfur compounds, contain olefins which provide octane. The naphtha is reacted with hydrogen in the presence of a sulfided hydrodesulfurization catalyst, which removes the sulfur as hydrogen sulfide. At the same time, at least a portion of the olefins desirable for octane are saturated. Under relatively severe heteroatom removal conditions, a portion of the aromatics may also be saturated. Some naphtha desulfurization processes use catalysts that have been at least partially deactivated by coke formation or by the use of inhibitors, to decrease the olefinic saturation that accompanies desulfurization. However, the partial deactivation also substantially reduces the sulfur removal activity of the catalyst, which is undesirable. Other naphtha processes use hydrodesulfurization catalysts modified with metal compounds, which selectively and permanently poison hydrogenation sites. The hydrogenation activity of these catalysts cannot be restored, even with regeneration. Such processes are disclosed, for example, in U.S. Pat. Nos. 5,286,373; 5,525,211; 5,423,975; 5,985,136 and 6,231,754.

A process improvement would result if the hydrogenation activity of a catalyst, having activity for heteroatom removal and hydrocarbon saturation (hydrogenation), could be selectively suppressed, while preserving the heteroatom removal activity. A further improvement would result if this selective suppression could be achieved with the catalyst on-line in a reactor. Such on-line, selective suppression could be accomplished without taking the reactor off-line, removing the catalyst, treating the catalyst, recharging the reactor, and then restarting the process.

SUMMARY OF THE INVENTION

The invention relates to a method for selectively suppressing the hydrogenation activity of a catalyst having activity for both heteroatom removal and hydrogenation, by a treatment which comprises contacting the catalyst with (i) hydrogen, (ii) at least one selectively deactivating agent that reduces the hydrogenation activity of the catalyst, and (iii) at least one protective agent that protects and preserves the heteroatom removal activity of the catalyst during the treatment. The hydrogen, selectively deactivating agent, and protective agent may be present as a mixture. Hydrodesulfurization selectivity as used herein refers to the hydrodesulfurization activity expressed in terms of a kinetic rate constant (such as Relative Catalyst Activity or "RCA") divided by the hydrogenation activity expressed in the same way. As used herein, hydrogenation selectivity is the reciprocal of the hydrodesulfurization selectivity. The treatment may, for example, be conducted at conditions of temperature and pressure typically used for heteroatom removal, which is advantageous for treating a catalyst in a reactor, without altering the reaction conditions. The method is applicable to a catalyst that has been, and is, on-stream in a reactor, to a fresh or newly manufactured catalyst, and to a regenerated catalyst. By heteroatom is meant sulfur, nitrogen and oxygen. By heteroatom removal is meant that a hydrocarbon feed containing heteroatom compounds is reacted with hydrogen in the presence of the catalyst, and the heteroatoms are removed as one or more of hydrogen sulfide, ammonia, and water.

The treated catalyst is useful for selectively heteroatom removal from hydrocarbon streams containing desirable olefins, diolefins and aromatic unsaturates, such as naphthas for motor gasoline (mogas), diesel fractions, coker gas oil, and the like. This includes hydrocarbons and fractions thereof boiling in the range of from $C_{4+}$ up to about 1050° F. and more typically up to about 750° F. An example of a specific embodiment is selective naphtha desulfurization (with "naphtha" meaning a hydrocarbon boiling in the naphtha boiling range, i.e., about $C_4$ to about 500° F.). For example, the treated catalyst is useful for motor gasoline ("mogas") processing wherein the mogas feed is selectively hydrodesulfurized, with reduced or no saturation of the olefinic compounds in the feed. Sulfur and olefin-containing naphthas that may be selectively hydrodesulfurized by the treated catalyst include full range, light, intermediate and heavy naphthas derived from petroleum, tar sand bitumen, shale oil and the like. Such naphthas include thermally cracked naphthas, coker naphthas, FCC naphthas and blends and fractions thereof, with end boiling points typically below 450° F., and which typically contain 60 vol. % or less olefinic hydrocarbons and sulfur levels as high as 7000 wppm and even higher. Thus, a further embodiment of the invention comprises a process for selectively removing heteroatoms, while preserving octane number, from a heteroatom and olefin-containing hydrocarbon feed, by reacting the feed with hydrogen in the presence of a catalyst having both heteroatom removal and hydrogenation activity, wherein the catalyst has been treated with (i) hydrogen, (ii) at least one selectively deactivating agent that reduces the hydrogenation activity of the catalyst, and (iii) a protective agent that protects and preserves the heteroatom removal activity of the catalyst during the treatment. As is explained in detail below, heteroatom removal activity can be described as hydrogenolysis activity and therefore the invention more broadly relates to preserving hydrogenolysis activity, while suppressing hydrogenation activity.

The one or more selectively deactivating agents used in the catalyst treatment will comprise hydrocarbon species having olefinic unsaturation. Mixtures of such hydrocarbons, at a total concentration found effective for the treatment of the invention, are found in, e.g., thermally cracked naphtha and thermally cracked naphtha may therefore be used during the treatment, to provide these hydrocarbons. Representative thermally cracked naphthas include, for example, steam cracked naphtha, coker naphtha, visbreaker naphtha, VGO thermal cracker naphtha, and mixtures thereof. After the treatment, all or some of these selectively deactivating agents (such as reactive, unsaturated hydrocarbons) used for suppression of the catalytic hydrogenation activity, may continue to be present during subsequent heteroatom removal. However, their concentration will be substantially less (e.g., 50%) than that used during the treatment. Otherwise, the heteroatom removal activity of the catalyst may be rapidly reduced to the level of an aged and/or coked catalyst. In addition to the selectively deactivating agent(s), the catalyst is treated with at least one protective agent.

Protective agents are useful for protecting and preserving the sulfur removal activity of the catalyst during the treatment and include species that adsorb to the catalyst and can be subsequently desorbed. Representative species include, for example, CO, $CO_2$, amines such as ethanolamine, and aqueous amines such as aqueous ethanolamine. During catalyst treatment, the protective agent protects the catalyst's heteroatom removal functionality from permanent deactivation by the selectively deactivating agent. At the conclusion of catalyst treatment, the concentration of the protective agent is decreased in order to at least partially restore the catalyst's heteroatom removal activity. The protective agent does not protect the catalyst's hydrogenation functionality. Consequently, the hydrogenation functionality is permanently deactivated. In other words, the hydrogenation activity is not restored when the concentration of the protective agent is decreased.

Without the presence of a protective agent, the catalyst's sulfur removal activity would be irreversibly deactivated by the selectively deactivating agent. During the catalyst treatment, the protective agent protects the catalyst's heteroatom removal activity. However, this protection may be accompanied by an inhibition of the catalyst's heteroatom removal activity. As discussed, inhibition of the catalyst's heteroatom removal activity during feed desulfurization (i.e., after treatment) would be undesirable. Consequently, a desirable protective agent is one that results in a decrease in the catalyst's heteroatom removal activity during treatment only. At the conclusion of catalyst treatment, the catalyst's heteroatom removal activity would be then substantially restored by discontinuing the use of the protective agent, or by decreasing its concentration to a level that has no inhibiting effect on the heteroatom removal activity. Thus, after the treatment, the use of the protective agent is discontinued, or reduced to a concentration too low to suppress the heteroatom removal activity. Discontinuing or reducing the concentration of the protective agent should restore at least a portion, preferably most, and more preferably substantially all of the heteroatom removal activity exhibited by the catalyst prior to the treatment.

In one embodiment, the catalyst to be treated comprises one or more metals selected from non-noble Group VIII and Group VI metals. Cobalt-molybdenum and nickel-molybdenum catalysts can be used. Catalysts comprising one or more noble metals can also be used, e.g., platinum, palladium, and platinum-palladium may be used.

The catalyst may be a fresh, meaning freshly sulfided, catalyst. Suitable catalysts include deactivated and partially deactivated catalysts that have had their catalytic activity restored by, for example, regeneration and sulfiding. In another embodiment, the catalyst to be treated is a "used" catalyst, i.e., a catalyst that has been used for hydrocarbon heteroatom removal for a period of time, including catalysts that have been used "on-oil" under catalytic hydrotreating conditions. In yet another embodiment, the catalyst to be treated may be partially deactivated catalyst, for example, one that has lost a portion of its activity for heteroatom removal. The catalyst to be treated may comprise mixtures of fresh, used, and partially deactivated catalyst.

In one embodiment, the treatment is conducted ex situ of the heteroatom removal reactor, and, in another, embodiment the treatment is conducted in situ. The treatment may be conducted in a single step, where the protective agent and selectively deactivating agent are both present under treatment conditions. In another embodiment, the treatment is conducted in successive steps, where the protective agent is introduced, the selectively deactivating agent is introduced, and then the protective agent is removed following deactivation of the hydrogenation sites. In another embodiment, the treatment is conducted in situ in response to changes in the heteroatom removal process feed composition, reaction conditions, or both. In this embodiment, the treatment may be employed, for example, as a method for regulating aspects of the heteroatom removal process, such as product heteroatom content, product octane number. Such regulation may permit desirable adjustments of process parameters such as temperature, hydrogen consumption, space velocity, and pressure. The treatments may be repeated as needed.

In yet another embodiment, the invention relates to a selectivated catalyst. Preferably, the catalyst comprises catalytically active sites that are active for heteroatom removal and deactivated for hydrogenation. More preferably, the hydrogenation sites are deactivated by a selectively deactivating agent. A preferred catalyst comprises heteroatom removal sites and hydrogenation sites wherein the ratio of the number of deactivated hydrogenation sites to the total number of hydrogenation sites exceeds the ratio of deactivated heteroatom removal sites to the total number of heteroatom removal sites. The total number of hydrogenation sites or heteroatom removal sites is the number of such sites on the fresh or freshly regenerated catalyst that has been activated for use in heteroatom removal processes by, e.g., sulfiding.

DETAILED DESCRIPTION

The invention relates to a method for selectivating bifunctional catalysts. More specifically, a catalyst having activity for both heteroatom removal and hydrogenation activity can be treated to suppress the undesirable hydrogenation activity with little or no loss of desirable heteroatom removal activity. The catalyst treatment involves contacting the catalyst with (i) hydrogen, (ii) at least one selectively deactivating agent that reduces the hydrogenation activity of the catalyst, and (iii) at least one protective agent that protects and preserves the heteroatom removal activity of the catalyst during the treatment. At the conclusion of the treatment, the concentrations of selectively deactivating agent and protective agent are decreased, resulting in a treated catalyst effective for feed heteroatom removal with decreased activity for hydrogenation of the feed's unsaturated species. Heteroatom removal, as the term is used herein, means the reacting of hydrogen and a hydrocarbon feed containing heteroatom compounds in the presence of a catalyst having heteroatom removal activity. The heteroatoms, which comprise one or more of sulfur, nitrogen, and oxygen, respectively form hydrogen sulfide, ammonia, and water, which are then removed or separated from the heteroatom-reduced feed. Most heteroatom removal processes and catalysts are designed primarily for removing sulfur and nitrogen, with oxygenates being removed along with the sulfur and/or nitrogen. Preferably, at least sulfur is removed from the feed to the heteroatom removal process. When a heteroatom is removed from a heteroatom-containing organic compound, bond cleavage occurs, with simultaneous hydrogen addition to both the cleaved heteroatom and the remaining organic fragment. The seventh edition of The Condensed Chemical Dictionary (Reinhold, 1966), defines the term "hydrogenolysis" on page 489, as "The cleavage of a bond in an organic compound with simultaneous addition of a hydrogen atom to each fragment." This chemistry occurs in heteroatom removal. "Hydrogenation" is also defined on the same page, as a "Combination of hydrogen with another substance, usually an unsaturated organic compound, and under the influence of temperature, pressure, and catalysts." Thus, hydrogenolysis and hydrogenation are distinguished from each other, by whether or not bond cleavage occurs. In the context of the invention, "hydrogenation" means saturating unsaturated carbon-carbon bonds in an organic compound, especially olefinic unsaturated bonds, with minimal and preferably no bond cleavage. Therefore, in its broadest sense, the invention comprises a process for selectively decreasing the hydrogenation activity, of a catalyst having both hydrogenation and hydrogenolysis activity.

Figure 4:
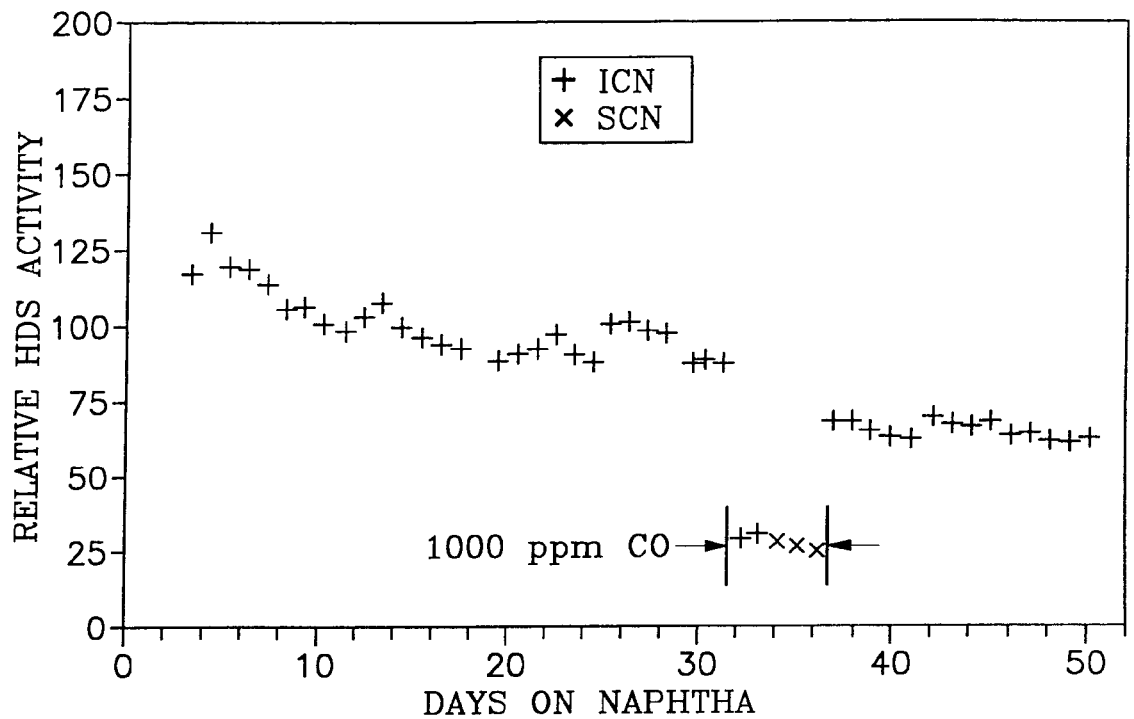
FIG. 4 is a graph illustrating restoration of catalytic hydrodesulfurization activity after the treatment of the invention.

A significant feature of the catalyst treatment of the invention is that it can be applied to a catalyst in situ in a reactor, and even while the catalyst is on-line removing heteroatoms from a feed that contains one or more heteroatoms and olefinic unsaturates. In this regard, multiple treatments can be carried out on the same catalyst in the reactor while the reactor is on-oil. This in-situ treatment can be achieved by temporarily adding to the feed and/or hydrogen passing into the catalyst-containing reactor operating at heteroatom removal conditions, a selectively deactivating agent and a protective agent. After the desired degree of hydrogenation activity suppression is achieved, addition of the protective agent and selectively deactivating agent is halted, which results in the restoration of at least most (more than 50% and preferably at least 75%), and in some cases all, of the heteroatom removal activity of the catalyst. For example, complete restoration of the hydrodesulfurization activity of a fresh or newly sulfided naphtha hydrodesulfurization catalyst, of the type used in the examples below, occurred after the catalyst had been treated according to the practice of the invention. After a similar catalyst that had been on-stream hydrodesulfurizing a cat naphtha feed had been treated, about 80% of its desulfurization activity was restored, as shown in FIG. 4 and Example 3 below. The heteroatom removal reaction then continues in the reactor, with a treated catalyst that now has a higher selectivity for heteroatom removal, by virtue of selectively lowered hydrogenation activity. Alternately, all or a portion of the heteroatom-containing feed stream passing into the reactor may be temporarily switched to a different feed, while the protective agent and selectively deactivating agent are introduced. In either case, sufficient hydrogen should be present to prevent permanent catalyst deactivation. By way of a non-limiting, but illustrative example specific to hydrodesulfurizing a naphtha feed, the catalyst can be treated while on-oil and in situ in the reactor, to increase the hydrodesulfurization (HDS) to olefin saturation (OS) selectivity (HDS/OS), by reducing the olefin saturation activity. This improvement is achieved by adding the protective agent (e.g., CO) and one or more selectively deactivating agents to the naphtha feed entering the reactor, for a treatment time sufficient to decrease the hydrogenation activity, and thereby increase the HDS/OS selectivity ratio of the catalyst. The treatment time ranges from about one hour to a few days, depending on the type and amount of selectively deactivating agent added. While hydrodesulfurization conditions are suitable for the catalyst treatment, different conditions of temperature, pressure, space velocity, etc. than used for the naphtha hydrodesulfurization may be employed.

While not wishing to be held to any particular theory, it is believed that during the treatment of the invention, the selectively deactivating agent produces coke on the catalytic hydrogenation sites, thereby deactivating the hydrogenation sites. However, the catalyst sites active for heteroatom removal are not permanently deactivated, since the protective agent protects those sites from the selectively deactivating agent. It has been discovered that the catalyst's hydrogenation activity is permanently attenuated following the treatment, but the catalyst's heteroatom removal activity can be at least partially restored by removing the protective agent.

The amount of hydrogen present during the treatment should be an amount sufficient to prevent permanent deactivation of the catalyst for heteroatom removal. When sufficient hydrogen is employed, the catalyst's heteroatom removal activity can be restored by removing the protective agent. The amount of protective agent present during treatment is an amount sufficient to protect the catalyst's heteroatom removal sites from a substantial, permanent deactivation in the presence of the selectively deactivating agent under treatment conditions. The amount of selectively deactivating agent present during treatment will be an amount sufficient for permanent and substantial attenuation of the catalyst's hydrogenation activity.

The amount of (i) hydrogen, (ii) protective agent, such as CO, and (iii) selectively deactivating agent present during the treatment in an on-oil or on-stream mode, may respectively range from (a) about 15 to about 1500 psia hydrogen partial pressure at the reactor outlet during treatment, (b) about 0.0015 psia to about 15 psia partial pressure of protective agent, and (c) about 0.004 to about 40 psia partial pressure of selectively deactivating agent. When another protective agent such as $CO_2$ or ethanol amine is employed, the desired partial pressure can be conventionally obtained by direct comparison of the vapor pressure of the agent to the vapor pressure of CO. By treat gas or hydrogen treat gas is meant all hydrogen or a mixture of hydrogen and inert species which do not effect the treatment or heteroatom removal processes, but serve merely as a diluent for the hydrogen, such as nitrogen, methane, ethane and the like. The amount of hydrogen in the gas will typically be at least 60 vol. % and preferably at least 75 vol. %.

A carrier hydrocarbon acting as a diluent for the selectively deactivating agent may be employed. For in-situ treatment, the carrier hydrocarbon may, for example, comprise the naphtha being passed into the reactor, to be desulfurized. For example, during a naphtha desulfurizing process the catalyst may be treated in situ in the reactor by conducting to the reactor the feed, hydrogen treat gas, the protective agent, and an effective or deactivating amount of the selectively deactivating agent. In this case, the naphtha feed comprises the carrier hydrocarbon. In another naphtha related example, in which all or a portion of a cat cracked naphtha feed being desulfurized is switched to a thermally cracked naphtha as the source of the selectively deactivating agent, the carrier hydrocarbon comprises a mixture of cat and thermally cracked naphtha, or all thermally cracked naphtha. When thermally cracked naphtha is the selectively deactivating agent, and a hydrocarbon carrier is employed, all or a portion of the hydrocarbon carrier may comprise one or more light hydrocarbons such as naphtha, light oil, etc. Any suitable hydrocarbon may comprise the carrier hydrocarbon. A hydrocarbon carrier will typically and preferably be used for a treatment in situ in a heteroatom removal reactor. When employed, a hydrocarbon carrier will typically and preferably be used for a treatment in situ in a sulfur removal reactor. In an embodiment in which the catalyst is treated in a separate vessel, ex situ of the reactor, use of a hydrocarbon carrier would be optional.

The protective agent prevents permanent deactivation of the sulfur removal activity during the treatment. Suitable protective agents include one or more species that adsorb to the catalyst and can be subsequently desorbed. Representative species include, for example, CO, $CO_2$, amines such as ethanolamine, and aqueous amines such as aqueous ethanolamine. The protective agent may be in the gas or liquid phase, but is preferably a gas or vapor at the treatment conditions for vapor phase reactions. In one embodiment, the protective agent is chosen so that the decrease in heteroatom-removal activity under treatment conditions exceeds the hydrogenation activity loss, and where the protective agent is removable for restoring at least a portion of the catalyst's hydrodesulfurization activity. In another embodiment, the protective agent is chosen so that the decrease in heteroatom-removal activity under treatment conditions is less than the decrease in hydrogenation activity, and where the protective agent is removable for restoring at least a portion of the catalyst's hydrodesulfurization activity The selectively deactivating agent(s) reduces the hydrogenation activity of the catalyst in the presence of the protective agent. The selectively deactivating agents generally comprise one or more hydrocarbon species having olefinic unsaturation. These selectively deactivating agents will be present during the treatment, in a concentration substantially greater (e.g., >50%) than any that may be present in the naphtha feed being reduced in sulfur, and would, but for the protective agent, permanently reduce the catalyst's heteroatom removal activity during the treatment. Preferably at least a portion of the selectively deactivating agent will have greater reactivity with hydrogen, than the predominant olefins in the feed which it is desired to preserve, during the heteroatom removal. As with the protective agent, the selectively deactivating agent is preferably gas or vapor, for vapor phase reactions. Representative selectively deactivating agents contain diolefins ("dienes"), triolefins, and aromatic unsaturates having olefinic unsaturation. For example, cyclic alkyldienes such as dicyclopentadienes and cyclopentadienes, styrenes, vinyl toluenes, indenes, non-cyclic alkyldienes and the like can be used as selectively deactivating agents, either alone or in combination. Such species may be found, for example, in thermally cracked naphthas. In the examples below, which are specific to hydrodesulfurizing cat cracked naphtha, the feed to the reactor was switched from a fluid cat cracked (FCC) naphtha, to a thermally cracked naphtha, along with CO as a protective agent. The amount of hydrogen present was about the same. An increase in the HDS/OS selectivity ratio of the hydrodesulfurization catalyst was observed. Following treatment for an effective treatment time, the concentration of thermally cracked naphtha and CO in the reactor feed were decreased, and the amount of hydrogen treat gas and FCC naphtha in the reactor feed was increased. A 20-70% increase in HDS selectivity after the treatment was experienced with the catalyst used for the naphtha desulfurization in the examples below.

The catalyst treatment may be conducted at the same or different conditions of temperature and pressure, etc., used for heteroatom removal, and either in situ or ex situ of the heteroatom removal reactor(s). A significant advantage of the treatment process of the invention is that it can be conducted in situ in a heteroatom reactor, even while the feed for heteroatom removal is being passed into the reactor or reactors and at the same or different conditions of temperature, pressure, space velocity, etc., used for the heteroatom removal. Heteroatom removal conditions encompass typical hydrotreating and hydrorefining conditions, with the severity of the conditions increasing with increasing feed boiling range. Nitrogen removal typically requires more severe conditions than sulfur removal. The mildest conditions are required for removing sulfur from a naphtha feed, with sulfur and nitrogen removal from, for example, a heavy gas oil, lube fraction, and particularly a deasphalted resid, requiring the most severe conditions. In general, the severity of the heteroatom removal process increases with increasing temperature, pressure and treat gas rate, and with decreasing space velocity. These conditions are well known and have been extensively published in patents and in the literature. In general and depending on the feed and its heteroatom content, heteroatom removal process conditions may broadly range from 200-950° F., 30-3500 psig, 100-10,000 SCF/B hydrogen treat gas and a liquid hourly space velocity (LHSV) of 0.1-10 based on the volume of feed, per volume of catalyst, per hour. More typical conditions will range from 400-800° F., 60-2,000 psig., 200-5000 SCF/B and a LHSV of 0.5-10. Typical temperatures and pressures for removing sulfur from naphtha and diesel range from about 400° F.-750° F., and 150-2,000 psig, with a space velocity of 0.5-10 LHSV and a treat gas rate of 100-3,000 SCF/B. Those skilled in the art will appreciate that these are merely illustrative, but non-limiting examples.

A catalyst having both heteroatom removal and hydrogenation activity prior to the treatment and useful in the practice of the invention, will comprise a composite of at least one catalytic component of a metal of both Group VIII and Group VIB. A catalyst support component may also be employed, but is not required. The catalyst may also include a component of one or more metals of Group IA, IIA and IB. The Groups referred to herein are those found in the Periodic Table of the Elements, copyrighted in 1968 by the Sargent-Welch Scientific Company. The Group VIII catalytic metal component will comprise a non-noble or noble metal component and more typically a non-noble metal component. The Group VIII non-noble metal will be at least one of Co, Ni and Fe and more typically Co and/or Ni. A noble metal, if present, will be Pt, Pd or a mixture of Pt and Pd. The Group VIB metal will typically be one or more of Mo and W, more typically Mo. While catalytic metal loading is not critical, the total amount of Group VIII and/or Group VIB metal, based on the weight of the metal oxide(s), will typically range from 0.5-30 wt. % of the total catalyst composite. Noble Group VIII metals are used in substantially less amounts than non-noble metal components. The amount of Group VIB metal may range from 5-50 and more typically 10-40 wt. % of the combined amount of both the Group VIII and VIB metals, based on the combined weight of the metal oxides. Non-noble Group VIII metals are preferred. Typical non-noble metal combinations include cobalt and molybdenum, nickel and molybdenum, and nickel and tungsten. Total catalytic metal loadings of Co and Mo of less than 12 wt. %, based on the weight of the Co and Mo as CoO and $MoO_3$, and a support component comprising at least one of alumina, silica and silica-alumina are preferred for selective naphtha desulfurization. The catalyst may be pre-sulfided or it may be sulfided in situ, using conventional sulfiding procedures. The catalyst will be sulfided prior to the treatment of the invention and to its use for heteroatom removal. In one embodiment, the catalyst to be treated is a selective naphtha hydrodesulfurization catalyst. For such catalysts, the amount of catalytically active metal component(s) will preferably be no more, and more preferably less, than 12 wt. % of the total catalyst composition, based on the weight of the one or more catalytically active metals calculated as the oxide.

Heteroatom removal according to the practice of the invention, may be conducted in one or more reaction stages and typically one or two. While more than one stage may be located within a single reactor vessel, more typically each stage will constitute a separate vessel. More than one reactor vessel may be used for a single stage. For a vapor phase reaction, the feed will be in the vapor state at least at the end of the reaction. Thus, while all or a portion of the feed may enter a reaction stage in the liquid state, the feed will be vapor at the end of the reaction. For a mixed phase reaction, a portion will be in the liquid state and a portion in the vapor state, at the end of the reaction. Vapor phase reaction stages are preferred for naphtha desulfurization. The amount of reaction hydrogen fed into each of the one or more stages is greater than the amount consumed by the heteroatom removal reaction(s) in each stage. The effluent from each stage comprises a mixture of one or more of hydrogen sulfide, ammonia, and water; a heteroatom reduced hydrocarbon feed; and un-reacted hydrogen. The hydrogen sulfide, ammonia, and water are typically removed from the heteroatom compound reduced feed by stripping. In the case of more than one reaction stage, the hydrogen sulfide, ammonia, and water are removed from the heteroatom-reduced hydrocarbon effluent of each stage, before it is passed into the next stage. Thus, by "stage" is meant that at least a portion of the heteroatoms in the feed are removed, to produce a feed reduced in heteroatom content, with the hydrogen sulfide, ammonia, and water then removed from the heteroatom reduced feed. This distinguishes the term "stage" from a reaction "zone", into which the entire effluent from an upstream zone is passed, including both the heteroatom reduced feed and the hydrogenated heteroatoms. Each stage may comprise more than one reaction zone, with each zone being defined by at least one catalyst bed.

The invention will be further understood with reference to the examples below.

EXAMPLES

In the examples below, the feeds for heteroatom removal were intermediate (ICN) and heavy (HCN) FCC cat naphthas, which contained sulfur compounds and olefins. The source of selectively deactivating agent was a thermally cracked naphtha (TCN), which also contained sulfur compounds and olefins. Both feeds contained reactive unsaturates, with the concentration of the primary ones, which are those in the greatest concentration, almost five times greater in the thermally cracked naphtha. These primary reactive unsaturates all contained olefin unsaturates, including diolefins, and it is believed that the selectively deactivating agent comprised primary reactive unsaturates. An analysis of these reactive unsaturates and their amounts for the ICN and TCN are set forth in the table below.

|  | ICN | TCN |
|---|---|---|
| Lighter Reactives |  |  |
| Hexadienes | 0.199 |  |
| mCPD* | 0.038 |  |
| Styrenes | 0.135 | 0.39 |
| DCPD** |  | 0.42 |
| 1,7-Octadiene |  | 0.44 |
| Total Light Reactives | 0.372 | 1.25 |
| Heavier Reactives |  |  |
| Indene | 0.096 | 0.76 |
| Vinyl Toluene | 0.1 | 0.19 |
| mDCPD*** | 0.13 | 1.09 |
| Total Heavier Reactives | 0.326 | 2.04 |
| Total Reactives | 0.696 | 3.29 |

*Methyl cyclopentadiene
**Dicyclopentadiene
***Methyl dicyclopentadiene

As shown in the table, the TCN contains almost five times as much reactive unsaturates, as does the ICN. Thus, the difference in reactive species between these two streams is more of amount, than the type of species present. Thus, it may be possible to increase the catalyst selectivity by adding only the protective agent to the cat naphtha or hydrogen treat gas. However, at these lower concentrations the time required for the treatment will be more on the order of weeks and months, and not the relatively few hours or days achieved by the process of the invention.

In all of the examples, a Co/Mo on alumina catalyst containing 4.5 wt. % $MoO_3$ and 1.2 wt. % CoO in 1.3 mm ASQ form was loaded into a fixed bed, isothermal down-flow, pilot plant tubular reactor and activated in situ in the reactor. Catalyst activation was achieved using a 10 mole % $H_2S/H_2$ gas blend in a virgin naphtha, for approximately 14 hours at two holding temperatures, 400° F. (gas/liquid mixed phase) and 650° F. (all vapor phase), and with a reactor pressure of 300 psig. The reactor was then cooled to 200° F., before the introduction of the naphtha feed to be desulfurized.

Example 1

Figure 1:
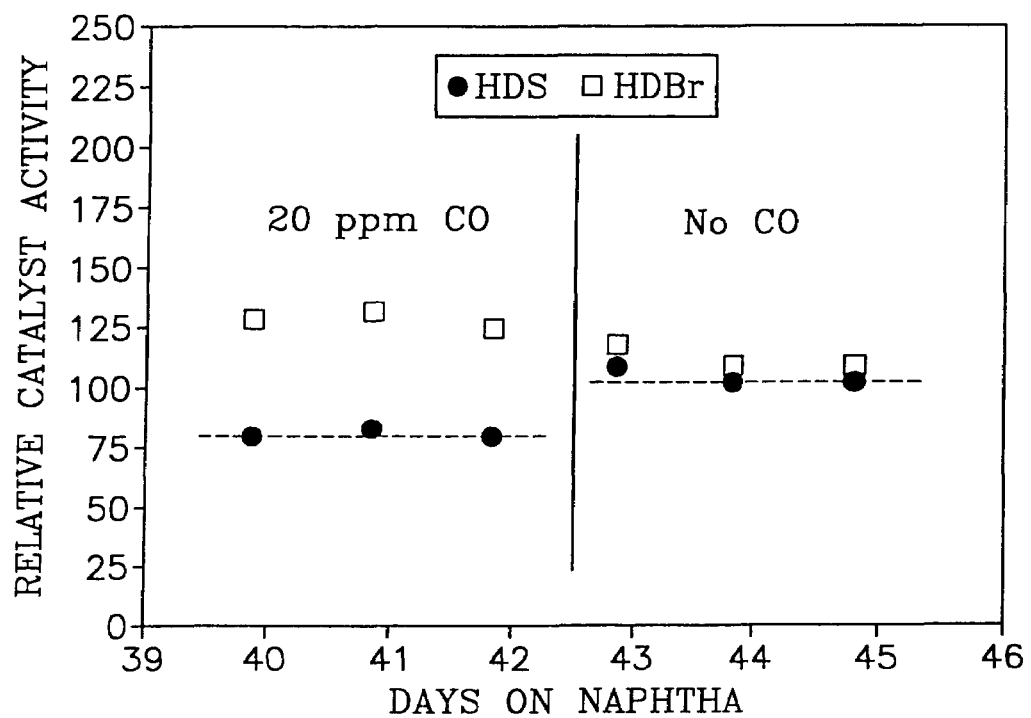
FIG. 1 is a graph showing reversible CO suppression of hydrodesulfurization activity of a catalyst having activity for both heteroatom removal and hydrogenation.
Figure 2:
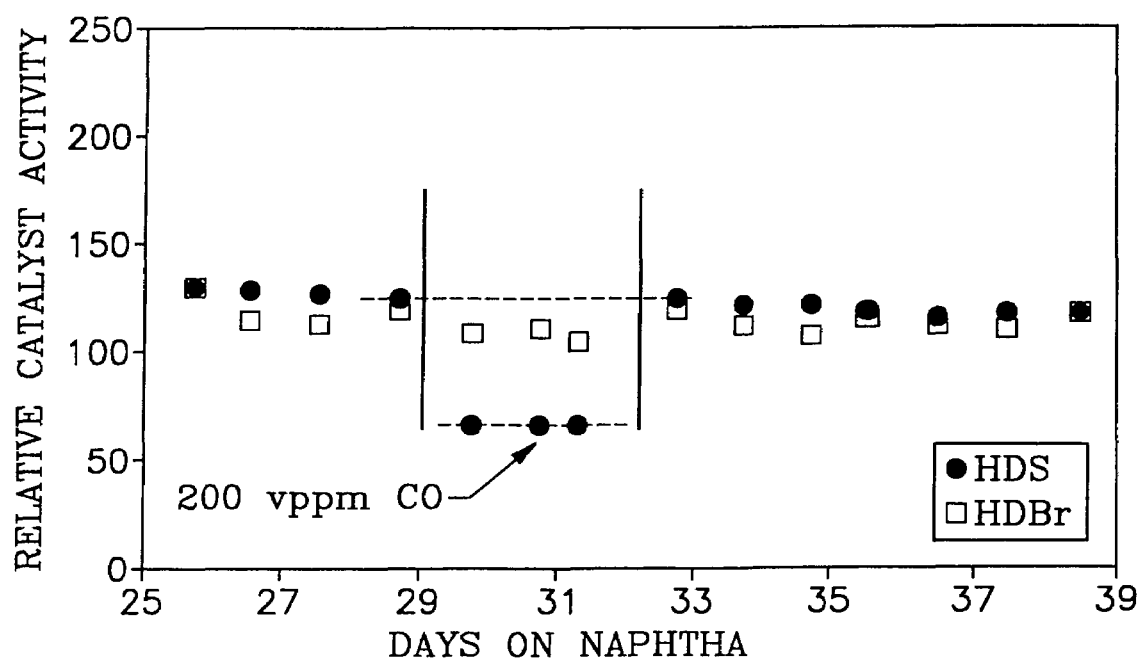
FIG. 2 graphically illustrates the effect of higher CO concentrations on the hydrodesulfurization activity.

The purpose of this experiment was to determine the effect that CO in the treat gas had on the HDS and HDBr activity of the naphtha hydrodesulfurization catalyst. By HDBr is meant olefin saturation (hydrogenation) activity, as measured by bromine number ("ASTM 1159"). The feed was an intermediate cat naphtha (ICN) having 1941 wppm total sulfur and a bromine number of 38. Test conditions included a temperature of 525° F., a total inlet pressure of 290 psig and a treat gas rate of 2000 SCF/B. The treat gas was 75 vol. % hydrogen, with the balance methane. The reactor was run with the ICN having 20 vppm CO in the treat gas, no CO in the treat gas and with 200 ppm CO in the treat gas. The results are shown in FIGS. 1 and 2.

For the first run, the reactor had been running with 20 vppm CO in the treat gas. After 42 days, the CO was removed from the gas. The results are shown in FIG. 1. The effect of the 20 vppm treat gas CO on the HDS and HDBr activity of the catalyst is immediately apparent. The presence of the CO in the treat gas had significantly lowered the HDS activity. However, when the CO was removed from the treat gas, about a 20 increase in the HDS activity of the catalyst was observed. The presence of the CO had a much smaller effect on the HDBr activity.

In the second run, the reactor was run on-stream for 29 days, when 200 vppm of CO was added to the treat gas. This resulted in about a 45% loss of HDS activity, as shown in FIG. 2. As was the case for the first run, the CO had little effect on the HDBr or olefin saturation activity. After the 200 vppm of CO was removed from the gas, substantially full restoration of the HDS activity of the catalyst was observed. This restoration is shown for days 32-39 in FIG. 2.

Example 2

Figure 3:
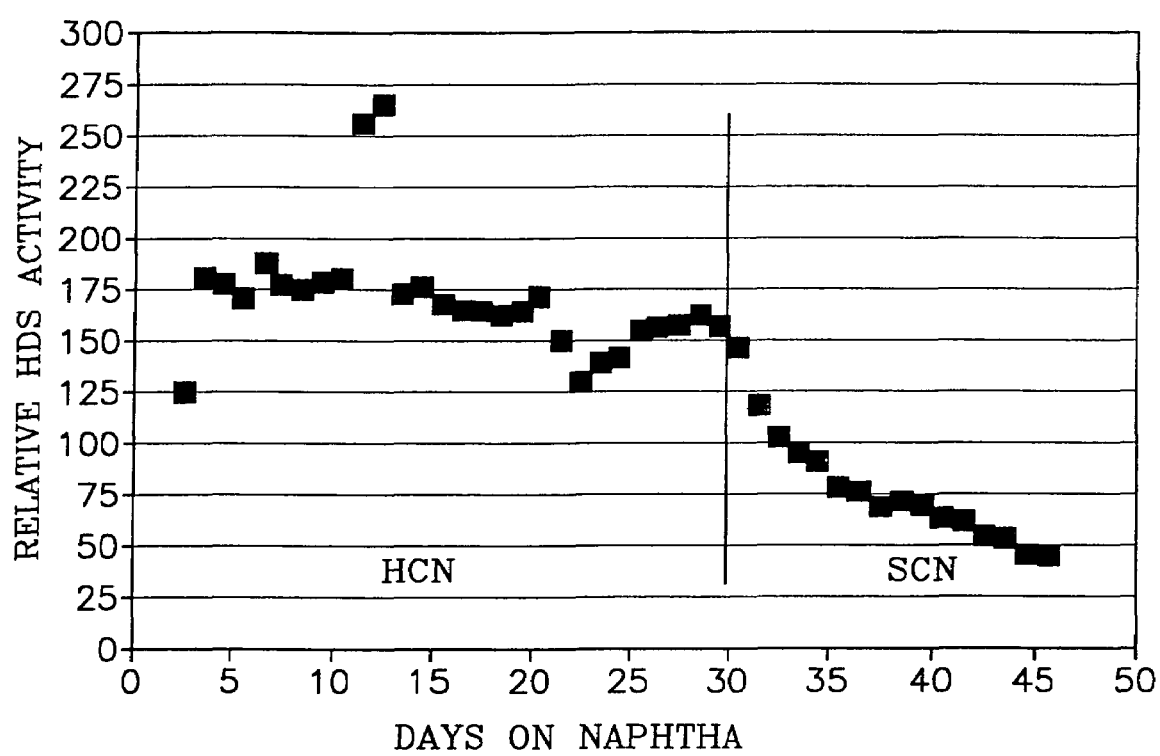
FIG. 3 is a plot showing rapid deactivation of hydrodesulfurization activity in the presence of thermally cracked naphtha.

In this example the feed was a heavy cat naphtha having a 162-475° F. boiling range, 229 wppm total sulfur and a bromine number of 19. The reaction conditions included a temperature of 525° F., a 200 psig total inlet pressure, a 100% hydrogen treat gas rate of 2000 SCF/B and a feed space velocity held constant at 3.0 LHSV. The pilot plant reactor was on-stream for about 30 days. As shown in FIG. 3, the HDS activity of the catalyst exhibited a moderate decline, typical for such a catalyst for the first days on the naphtha. At day 31, the feed was changed to a thermally cracked naphtha. The thermally cracked naphtha had 200 wppm of sulfur and a bromine number of 35.5. The reactor inlet pressure was raised to 225 psig and the space velocity reduced to a constant 2.0 LHSV for this feed, with all the other conditions remaining the same. The thermally cracked naphtha feed was run in the reactor from about day 31 to day 46. FIG. 3 shows the steep and rapid decline in the HDS activity of the catalyst while on the thermally cracked naphtha, as a result of the selectively deactivating agent present.

Example 3

In this experiment, the naphtha feed was an intermediate cat naphtha having 3340 wppm total sulfur and a bromine number of 50.7, representing 32.8 vol. % feed olefins. The pilot plant reactor was on-stream desulfurizing the naphtha feed at conditions to achieve from 85-95 wt. % HDS. The conditions included a temperature which varied from 525-535-562° F., a total inlet pressure of 225 psig, 2000 SCF/B of a 100% hydrogen treat gas and a liquid hourly space velocity of from 2.5-4.5.

After 31 days of naphtha desulfurization, 1000 vppm of CO was added to the treat gas. This resulted in a substantial reduction of about 70% of the HDS activity of the catalyst. On the 34$^{th}$ day, the naphtha feed was switched from the ICN to a TCN feed, while maintaining the 1000 vppm of CO in the treat gas. The TCN and CO continued to be fed into the reactor, along with the treat gas, for three days, after which the CO was removed from the gas and the feed switched back to the ICN. This resulted in restoring about 80% of the HDS activity observed prior to the treatment. The three day catalyst treatment was conducted in the reactor at 525° F., 225 psig, a treat gas rate of 2000 SCF/B and a thermally cracked naphtha space velocity of 2.0 LHSV. After the three-day treatment, the reactor was run at 562° F., 225 psig, 2000 SCF/B and an ICN space velocity of 4.5 LHSV.

Figure 5:
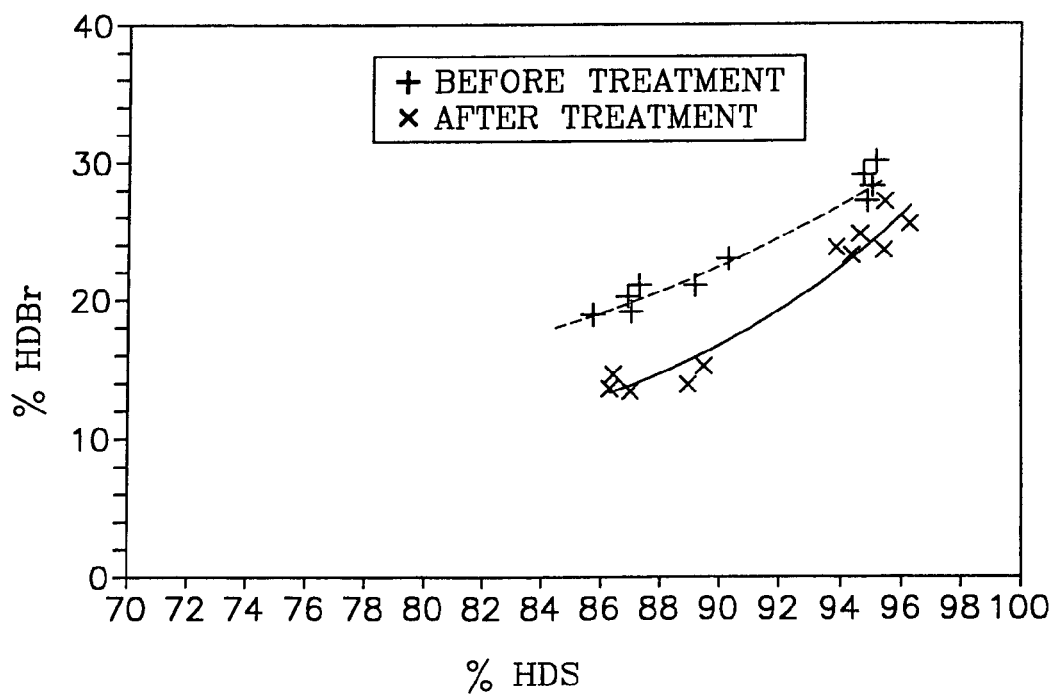
FIG. 5 is a graph showing olefin saturation as a function of desulfurization, before and after the treatment of the invention.

The reduction and recovery of the HDS activity is shown in FIG. 4. The "+" points refer to the ICN feed, while the "x" points indicate the temporary switchover to the TCN. The low activity + and x points for days 32-36 are a result of the presence of the 1000 ppm of CO in the hydrogen treat gas. The immediate drop and recovery of HDS activity as a function of the addition of the CO and then the subsequent removal of both the CO and TCN is apparent. FIG. 4 clearly shows the about 80% recovery in HDS activity, following the treatment of the invention. FIG. 5 shows the relative % HDBr, as a function of the % HDS or desulfurization level, before and after the $H_2$—CO-thermally cracked naphtha treatment. Before the treatment and at a reactor temperature of 535° F., the % HDBr ranges from about 19-24 at a corresponding % HDS of from about 86-91. After the treatment and at a reactor temperature of 562° F., over the same range of % HDS, the % HDBr ranges only from about 13-16. These results demonstrate that the effect of the treatment increased the HDS/OS selectivity primarily by reducing the olefin saturation activity of the catalyst, without a corresponding reduction in kind of the HDS activity.

The invention claimed is:

1. A catalyst having activity for both heteroatom removal and hydrogenation and which has been treated with hydrogen, at least one selectively deactivating agent for decreasing hydrogenation activity, and a protective agent that protects and substantially preserves heteroatom removal activity during treatment, said catalyst:
   comprising heteroatom removal sites and hydrogenation sites,
   is comprised essentially of an oxide of at least one Group VIB metal, an oxide of at least one Group VIII metal, and optionally an inorganic metal oxide support component, and
   which is optionally sulfided,
   wherein a ratio of deactivated hydrogenation sites to total hydrogenation sites exceeds a ratio of deactivated heteroatom removal sites to total heteroatom removal sites, in the absence of both the protective agent and the at least one selectively deactivating agent.

2. A catalyst according to claim 1 wherein the catalyst comprises at least one refractory inorganic oxide support.

3. A catalyst according to claim 2 wherein the refractory inorganic oxide support comprises silica, alumina, or mixtures thereof.

4. A catalyst according to claim 3 wherein the Group VIII metal is selected from the group consisting of Co, Ni, Fe, Pt, Pd and mixtures thereof.

5. A catalyst according to claim 4 wherein the Group VIB metal is selected from the group consisting of Mo, W and mixtures thereof.

6. A catalyst according to claim 5 wherein the Group VIII metal is selected from the group consisting of Co, Ni, Fe and mixtures thereof.

7. A catalyst according to claim 6 wherein the catalyst support component comprises alumina.

* * * * *